Nov. 14, 1967 R. F. TURQUOIS 3,352,237

DETONATOR WITH ADJUSTABLE DELAY AND BUILT-IN SETTING DEVICE

Filed June 23, 1966 10 Sheets-Sheet 1

DETONATOR WITH ADJUSTABLE DELAY AND BUILT-IN SETTING DEVICE

Filed June 23, 1966 10 Sheets-Sheet 3

Nov. 14, 1967 R. F. TURQUOIS 3,352,237

DETONATOR WITH ADJUSTABLE DELAY AND BUILT-IN SETTING DEVICE

Filed June 23, 1966 10 Sheets-Sheet 7

United States Patent Office 3,352,237
Patented Nov. 14, 1967

3,352,237
DETONATOR WITH ADJUSTABLE DELAY AND BUILT-IN SETTING DEVICE

Rene F. Turquois, 8 Rue Djebli, Rabat, Morocco
Filed June 23, 1966, Ser. No. 559,871
Claims priority, application France, June 25, 1965, 22,224; Mar. 1, 1966, 55,793
9 Claims. (Cl. 102—28)

ABSTRACT OF THE DISCLOSURE

A readily adjustable detonator having a relay powder column and an ignition bead movable along the relay column to vary the effective length of the relay column.

The present invention concerns a new type of delayed detonator which allows the period of delay to be set to the required time at the moment of its use.

It is known that in order to obtain the best possible effects in the course of the clearing of land by means of explosives, it is the usual custom to space out firings by inserting in between them defined delays which depend especially on the type of the work and on the structure of the land.

One is thus induced to use a certain number of delayed detonators whose principle consists of igniting the end of one column of powder with the aim of igniting a charge on its other end and which charge, in turn, is intended to bring about the detonation. The length and composition of the retarding powder column will determine the delay of the detonator.

The detonators in use are, thus, numbered in relation to the delay which they supply, a delay which is a multiple of 500 ms. in ordinary detonators and a multiple of 20, 25 or 30 ms. in microdetonators.

It being a fact that the number of successive shots in one blasting, as well as the number of blasts of each successive firing, depend on numerous factors, such as the dimensions and shape of the work, nature of the grounds, type of plugs used, nature of the explosive (considerations of price and regulations), the required fragmentation of the products, etc., one is confronted with a disparity between the various delays used which is sometimes considerable. One simple blast in a drift may, for example, require 10 different delays, while the number of shots fired may vary from 1 to 12 for each blast.

Thus, the principal object of the present invention consists in a new type of detonator which is suitable to be adjusted at the moment of its being used in order to supply a given delay which may be a multiple of a definite duration.

This new type of detonator presents a considerable advantage in comparison to ordinary detonators for it enables the suppression of control estimates which are often rendered difficult by reason of fluctuarions in the consumption of detonators with different delay numbers and which are due to the often abrupt or unforeseen changes in the conditions of the site or sites. The use of this new type of detonator further eliminates the risks of loss due to series of detonators which are not matched and are therefore unuseable.

Another object of the present invention consists in a new detonator whose delay may be adjusted in a continuous manner when it is being used.

In fact, it is found that the most favorable spacing between successive delays does not forcibly correspond to the values supplied by the actual present detonators. The new type of detonator which is the object of the invention, allows in contrast, the setting of any multiple of a defined period of time.

Therefore, the intervals between two successive delays can be reduced and the total number of blasts which can be fired during the maximum period of time provided by certain regulations can be increased. Thus, instead of arranging 10 spaced delays of 500 ms., allowing one to fire 10 successive blasts in 5 seconds only (time limit maximum as allowed by regulations), one could use only one and the same type of detonator by firing 20 successive blasts spaced out at 250 ms. or 50 successive blasts spaced out at 100 ms.

On the other hand, such a detonator may give evidence of the best spacing for the type of land which is to be cleared on the basis of simple tests.

It would even be possible, in accordance with the test results, to use spacings between successive shots which need not necessarily be the same from one shot to the next.

Further, the great simplification with respect to the manufacture of detonators must be noted, as only one single or possible two types of detonators will have to be produced.

Another object of the present invention consists in the provision of means capable of blocking the delay setting device at a predetermined value in order to avoid any possibility of irregularities in the course of any later handling.

On the other hand, there occur numerous cases of the blast necessitating the use of detonators with delays which are set to very precise values, that is, multiples of a given value.

Thus, another object of the invention consists in the provision of means allowing one to set the value of a delay to a given multiple of a predetermined delay with quite a special precision, as well as providing means for the instantaneous and precise ignition of the powder columns by means of relays and charges.

Other advantages and characteristics of the invention are shown by the present description in conjunction with the attached drawing and which represents by way of example and in a non-limitative manner, the means employed with the view of setting the delay, the blocking of the detonator at a defined delay value and its ignition.

Figures 12, 16, 17, 18:
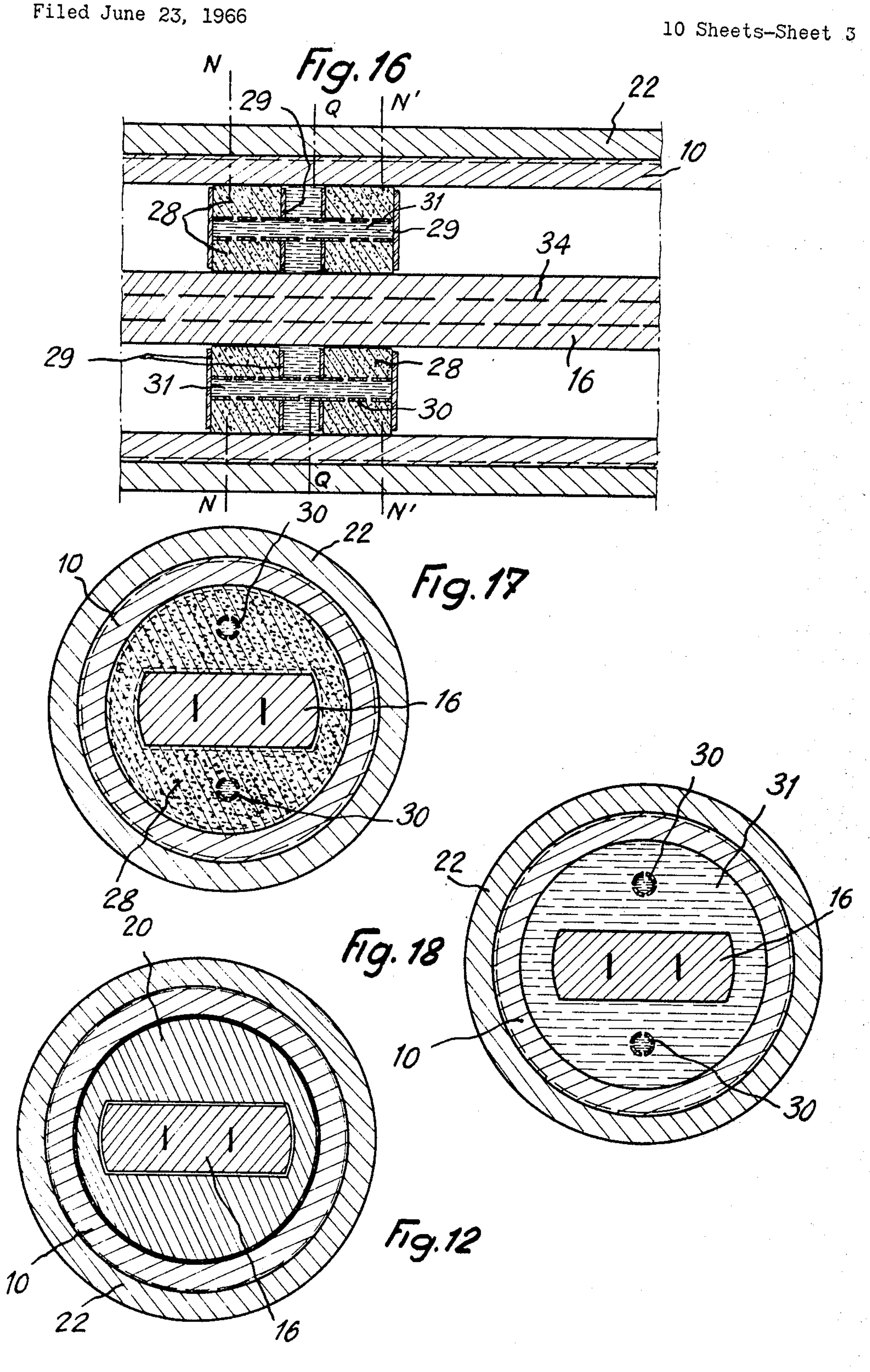
Figures 14, 15:
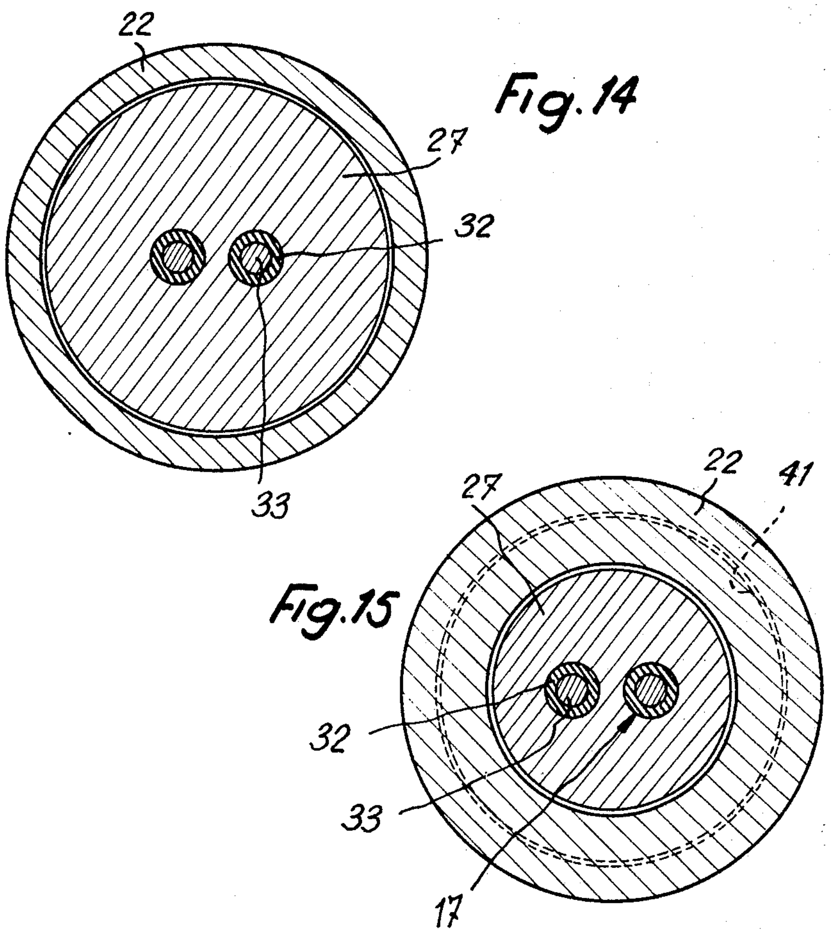
Figure 19:
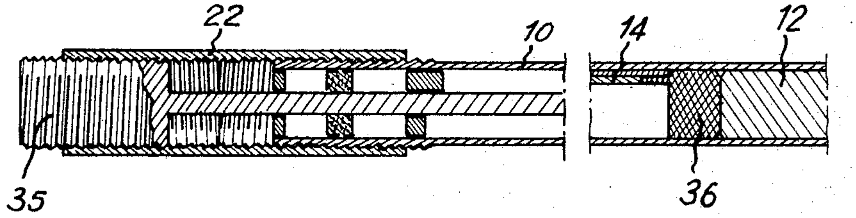
Figure 20:
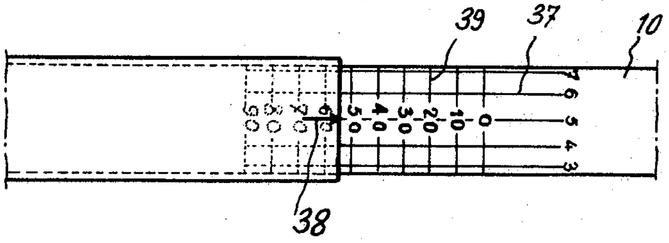
Figure 20A:
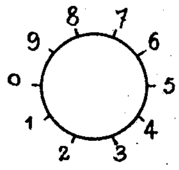
Figure 21:
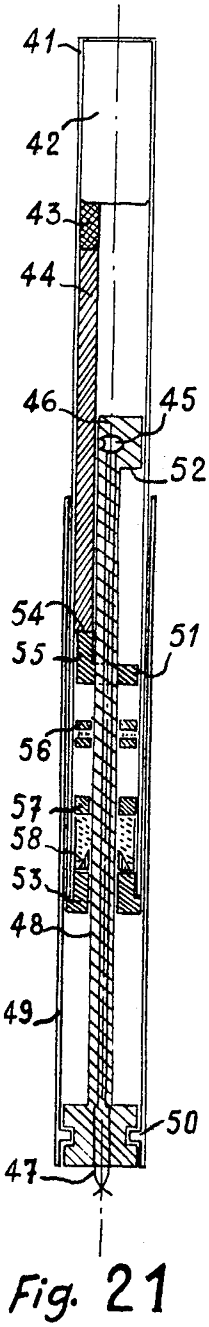
Figures 22, 23:
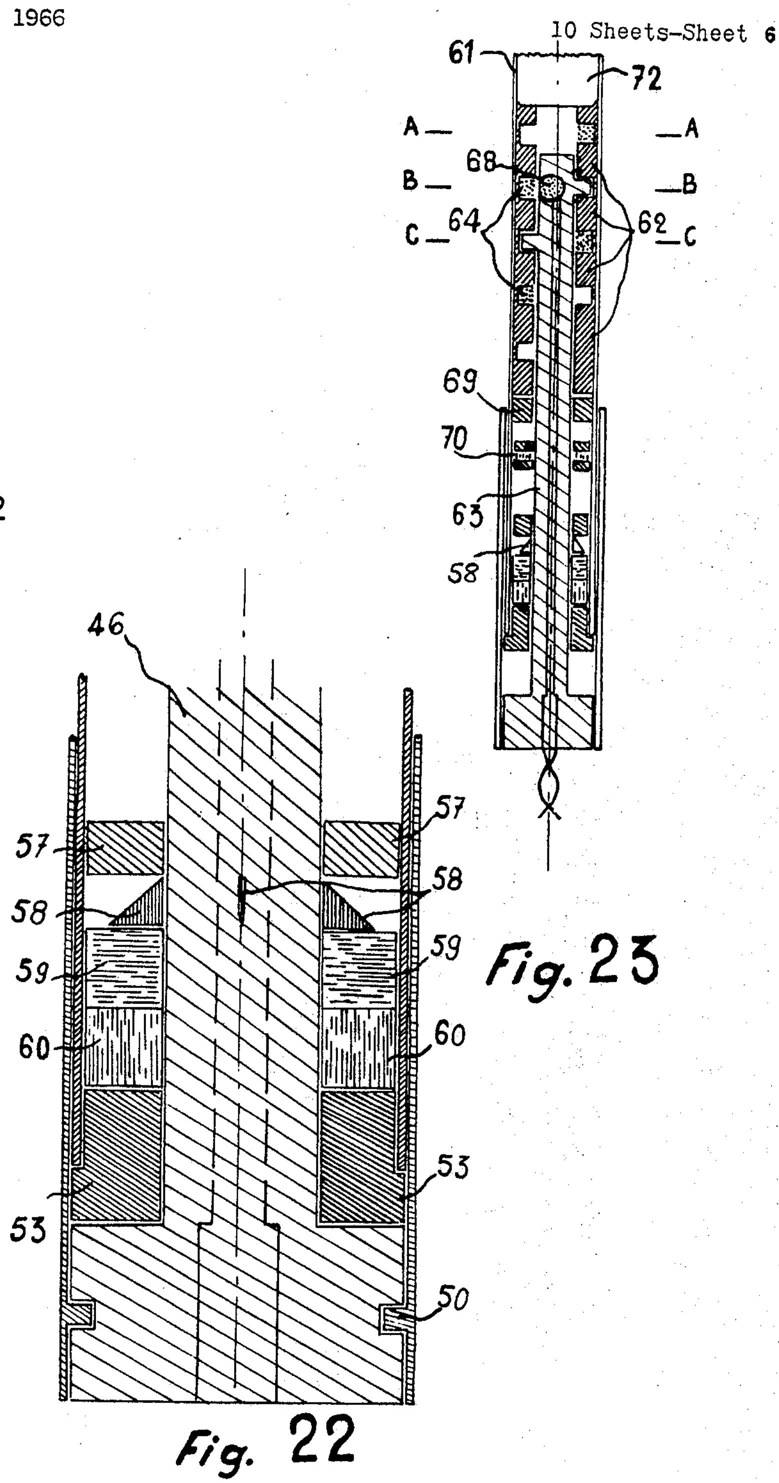
Figure 24:
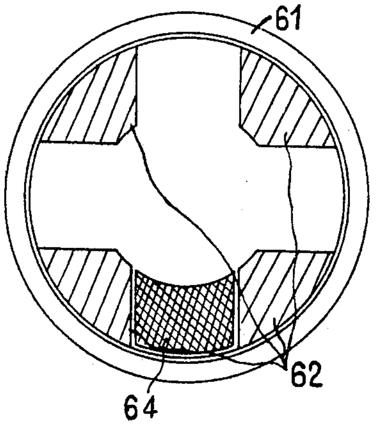
Figure 25:
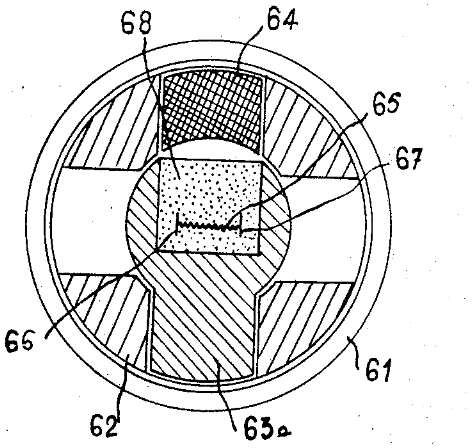
Figure 26:
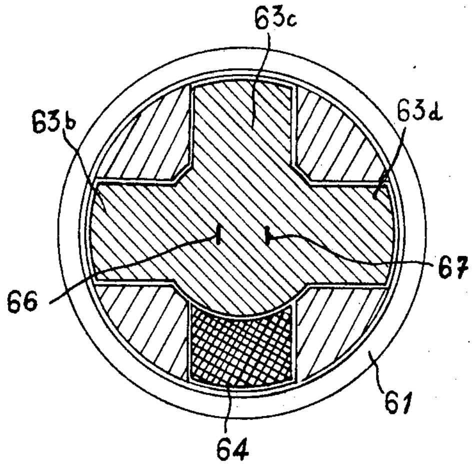
Figure 27:
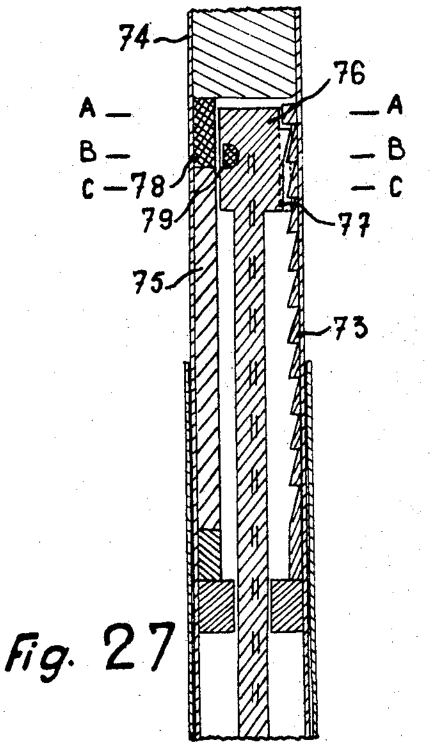
Figure 28:
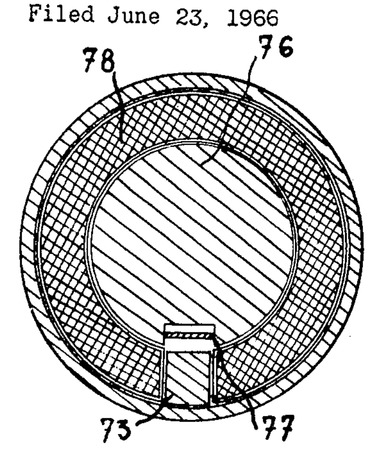
Figure 29:
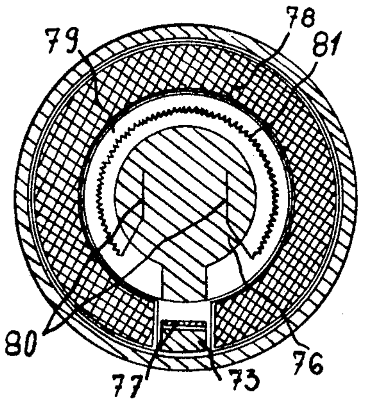
Figure 30:
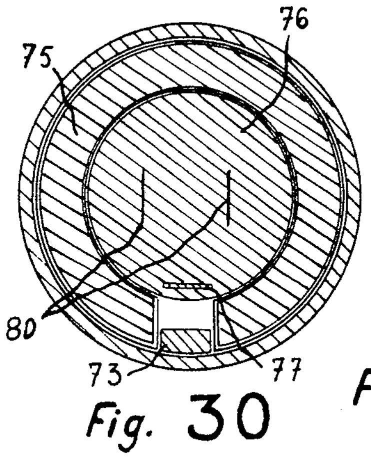
Figure 31:
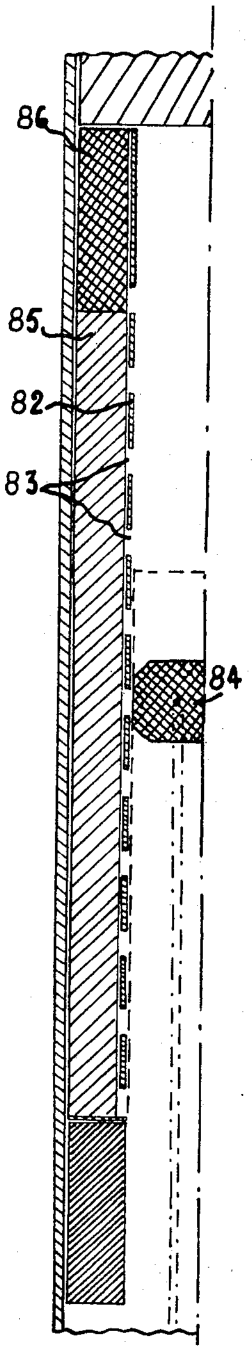
Figure 32:
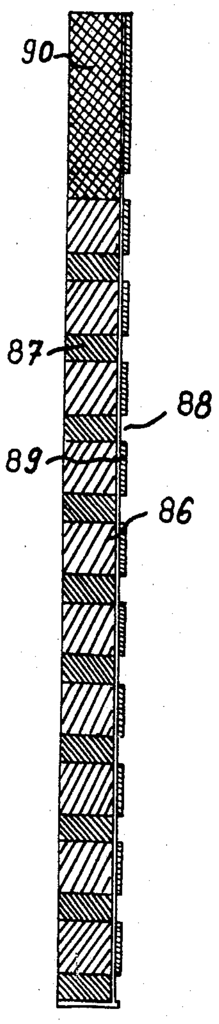
Figure 33:
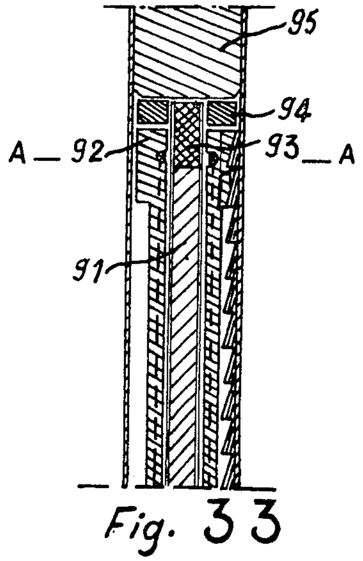
Figure 34:
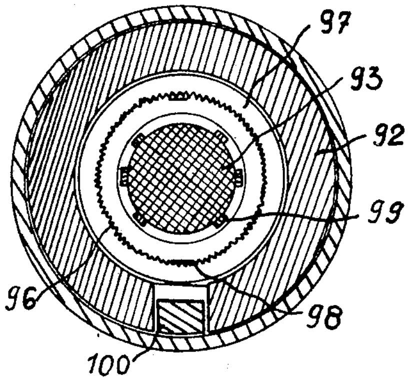
Figure 35:
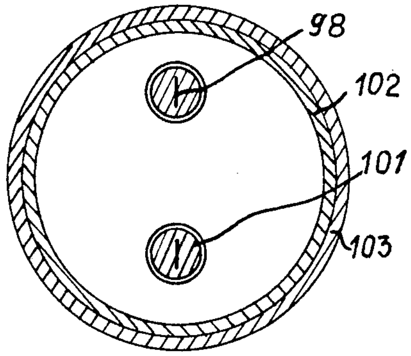
Figure 36:
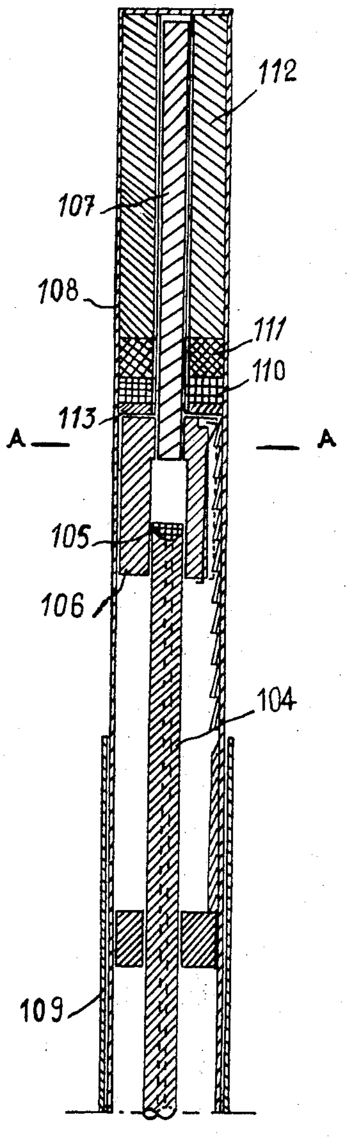
Figure 37:
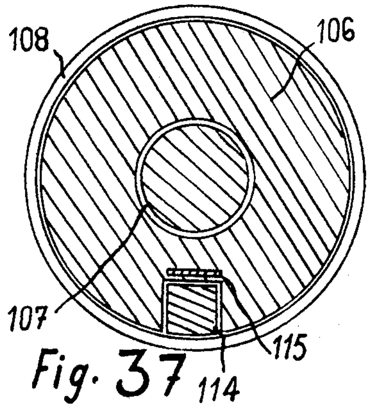
Figure 38:
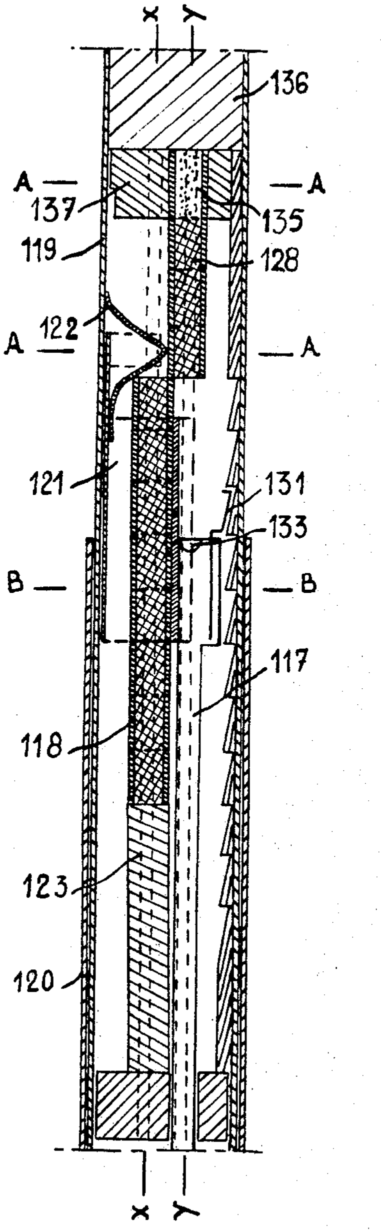

FIGS. 5 to 13: Sections C—C, D—D, E—E, F—F, G—G, G′—G′, H—H, I—I and J—J;

FIG. 14: The identical sections K—K and K′—K′;

FIG. 15: Section L—L;

FIG. 16: A detail of the sealing point with indications of sections N—N, Q—Q, N′—N′;

FIG. 17, the identical sections N—N and N′—N′;

FIG. 18, the section Q—Q;

FIG. 19, a diagrammatic view of a variant of the driving device of the ignitor and of the location of the primary charge;

FIG. 20, the method of setting and reading the values of the delays;

FIG. 20*a*, the values of all the longitudinal settings;

FIG. 21 represents a detonator the case of which simply slides into the sleeve;

FIG. 22 represents the case blocking device in relation to the sleeve before setting;

FIG. 23 represents a variant of the detonator shown in FIG. 21;

FIGS. 24 to 26 represent in turn sections A—A, B—B and C—C as indicated in FIG. 23;

FIG. 27 represents a detonator of an analogous type to that of FIG. 21, equipped with a delay setting device working on the basis of predetermined discontinuous values;

FIGS. 28 to 30 represent, in turn, sections A—A to C—C as indicated in FIG. 27;

FIG. 31 represents a protective device for the relay column of a detonator conforming to that shown in FIG. 21;

FIG. 32 represents a variant of the device shown in FIG. 31;

FIG. 33 represents a detonator comprising an improved ignition device;

FIGS. 34 and 35 represent, in turn, sections A—A as indicated in FIG. 33 and the cross-section of the bead holder in a location beyond the retarding powder after a rotation of 90°;

FIG. 36 represents a detonator with axial ignition;

FIG. 37 represents the section A—A of the detonator shown in FIG. 36;

FIG. 38 represents a variant of a detonator with axial ignition; and

Figures 39, 40:
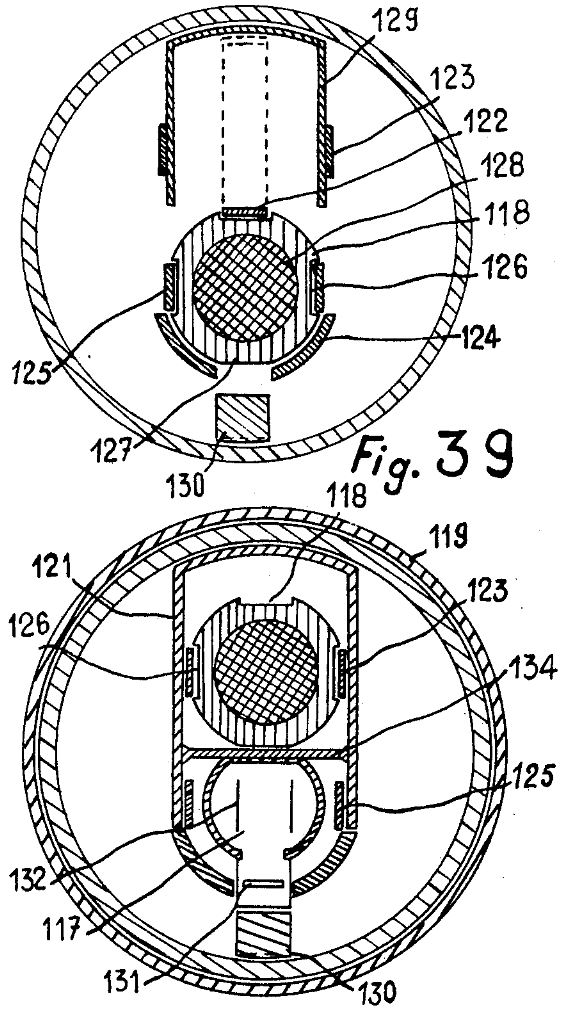

FIGS. 39 and 40 represent the sections A—A and B—B.

The constituent units of an ordinary detonator have been drawn in FIG· 1.

They comprise a case 1 of copper or aluminum containing a so-called secondary charge 2 which is ignited by the primary charge 3.

This charge is generally in direct contact with a retarding element numbered 4, consisting of the retarding powder column 4, the length and nature of which determines the value of the detonator delay.

The ignition device consists of an ignition bead 5, containing a resistance 6 connected to the fuse wires 7 by means of the bridge 8.

The fuse wires 7 are sheathed by a sealing bush 9.

The detonator is ignited with the help of an electric current, the intensity, length and power of which has been suitably calculated to bring the resistance to a temperature at which the bead will start to ignite, the latter being able, by the way, to be replaced by an ignition powder. Ignition is transmitted to the retarding powder column 4 whose composition and length are suitably chosen so that it will burn within a time *t* which is equal to a multiple of 500 ms. in the case of ordinary detonators. If it is a case of detonators with a micro delay, the time required for the whole of the retarding column to burn is equal to *n* times 20, 25 or 30 ms. The number *n* defines the value of the delay in relation to the instantaneous detonator named "Zero delay." When the retarding powder ignites at the end of the period *t*, the primary charge 3 being then ignited will, in turn, detonate the secondary charge 2.

In order to enable variable delays to be available, the detonator which is the object of the present invention, comprises a device which allows the retarding powder column to be ignited at any point.

Figure 1:
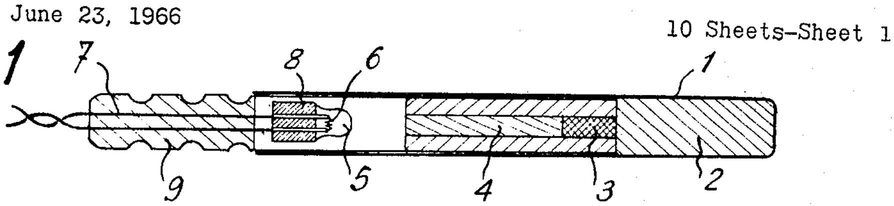
FIG. 1 represents the diagram showing the principles of a detonator with the traditional delaying device.
Figure 2:
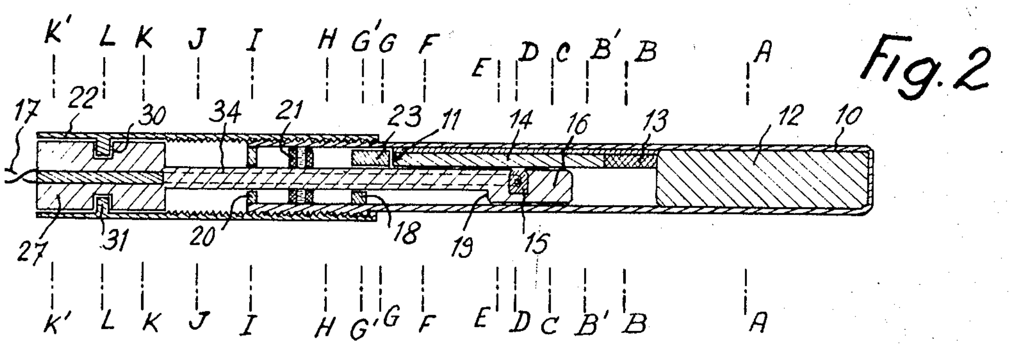
FIG. 2 represents a longitudinal section of the detonator which is the object of the invention and on which the references of the various sections from A—A to L—L have been plotted.

Such a detonator is represented in FIG. 2. As in the case of the ordinary detonators, it consists of a case 10 containing a secondary charge 12 which is detonated by the action of the primary charge 13 which is in contact with the retarding element 14.

In accordance with the invention, the retarding column possesses a sufficient length to correspond to the longest delay which it is required to attain.

In order to enable the powder to be ignited at any point of the retarding powder column 14, the ignition bead 15 is placed on a support 16 which can slide along the retarding element.

This support contains the fuse wires 17, connected to conducting blades 34 which can be seen in the various sections represented in FIGS. 7 to 13 and which end in the resistance which is enclosed by the ignition compound.

A stop block 18 allows the definition of the location of the ignition bead in relation to the retarding column and which corresponds to the longest delay given by the detonator. This stop then comes into contact with the section 19 of support 16.

A stop block 20 at the end of the path of the ignition device allows one to define the location of the ignition bead in relation to the retarding column 14 in order to obtain a delay of 0.

Between the stops 18 and 20, a mobile seal joint has been provided. This joint prevents any humidity from penetrating into the parts of the detonator which contains the ignition bead, the retarding powder and the charges.

The movement of the bead 15 in relation to the retarding unit 14 is obtained by the relative movements of the bush 22 and the casing 10. To this effect, the casing 10 can glide into the interior of the bush 22 by means, for example, of the provision of threads with the same pitch applied to the interior of the bush 22 and to the exterior of the casing 10.

The detonator with adjustable delays which has just been briefly described, can obviously be produced in various ways.

By way of an example, the casing 10 can be made, as in the case of the traditional detonators, of copper or of aluminum but, apart from the section containing the second charge 12, it could also just as well be produced from other materials. Thus, in order to facilitate the setting of the delay which it is required to obtain, the section of the casing which does not contain the secondary charge, is made of a transparent plastic material and the part played by this will be explained later.

Figure 3:
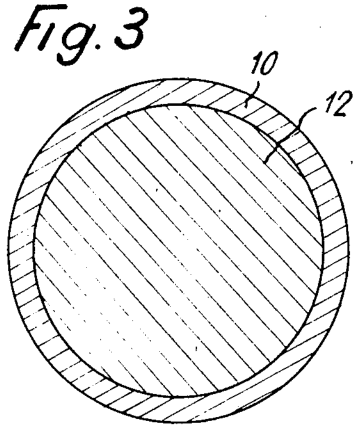
FIG. 3 represents the cross-section ref. A—A, FIG. 2.
Figure 4:
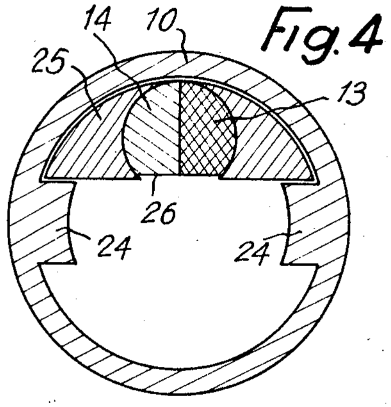
FIG. 4 represents the right-hand half of the section B—B and the left-hand half of section B′—B′.

On the other hand, according to the invention, the casing 10 carries two diametrically opposed longitudinal pins 24, shown in FIGS. 4 to 10 representing the sections B—B to G'—G'. These pins are provided to fix the relay device consisting of the retarding column 14. The mounting 25 for the retarding unit 14 may further carry the primary charge 13, as can be seen in FIG. 4. This mounting is shown in FIGS. 4 to 8. The pins 24 are not shown in FIG. 3, as this part of the casing only contains the primary charge. Pins 24 further serve as a guide for the device 16 which supports the ignition bead 15.

The secondary charge 12 may obviously be any sort.

The retarding unit 14 differs from the ordinary retarding units in that its length, instead of varying as a function of the required delay, is fixed whatsoever the delay may be.

The mounting 25 supporting the relay column 14 may consist of a metallic or plastic fitting filled with the same or an analogous material as that used for covering the relay columns of traditional relay detonators. However, in accordance with the invention, the relay column 14 is entirely covered by this material with the exception of the surface 26 along which the ignition bead 15 can move, as can be seen in FIGS. 4 to 8. In this manner, the precision of the delay setting is increased.

To avoid any deterioration of the relay column 14 along the surface 26, this column can be advantageously placed into a small thin sleeve of a complex or even a simple film of cellulose hydrate which will maintain its cohesion and possibly, protect it against humidity as well.

The mounting 25 has such a shape that it follows the exact shape of the casing 10 and the pins 24 as is shown by the sections B—B to F—F in FIGS. 4 to 8. The retarding unit is inserted into the casing at the moment of manufacture by means of its mounting which is fitmounted in order to avoid any movement of the retarding after it has been fixed in place and thus to ensure the precision of the delay setting. Fixing of the retarding relay is completed by gluing its end 11 to the upper part 23 of the stop block 18. This stop is itself glued to the casing 10.

Figures 5, 6:
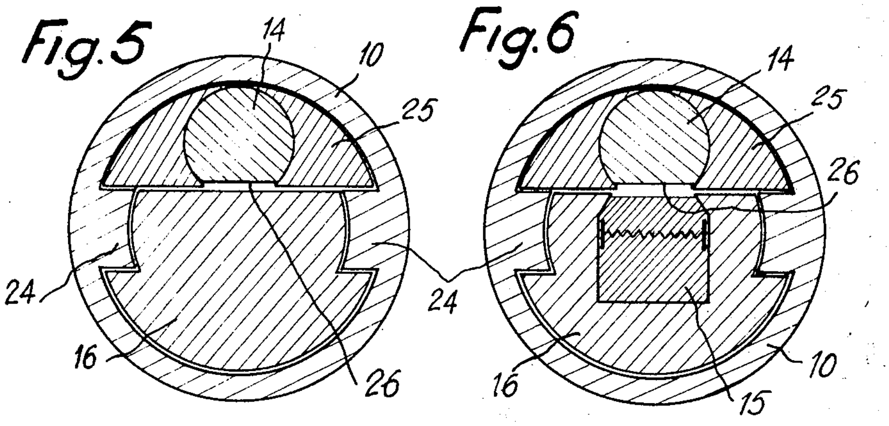
Figure 7:
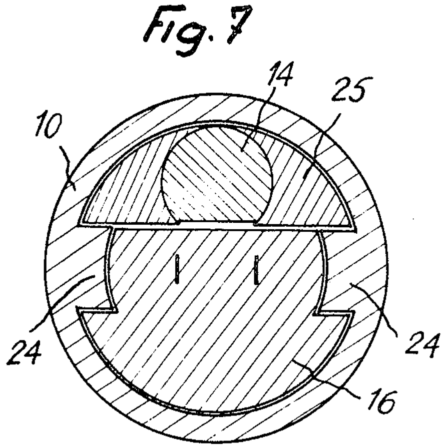
Figure 8:
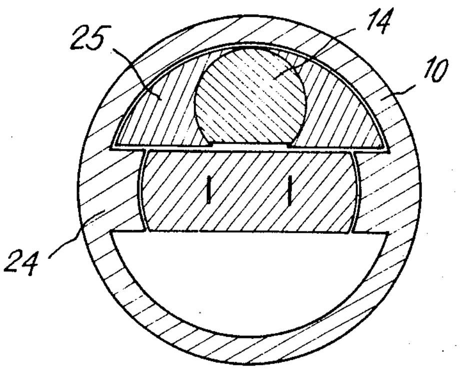
Figure 10:
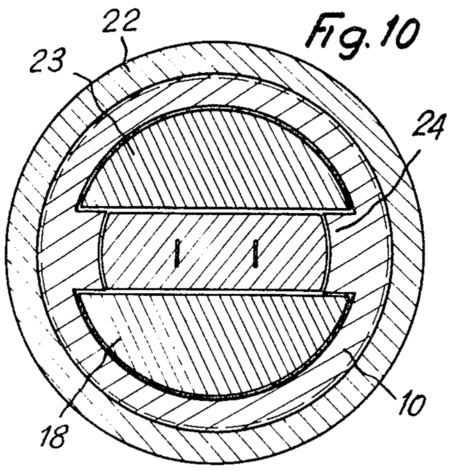
Figure 9:
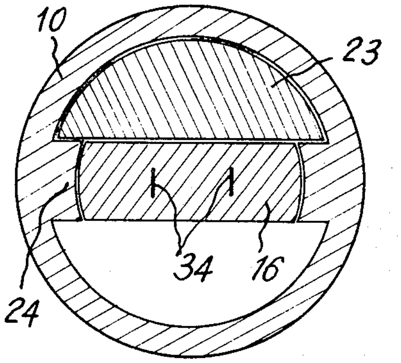
Figure 11:
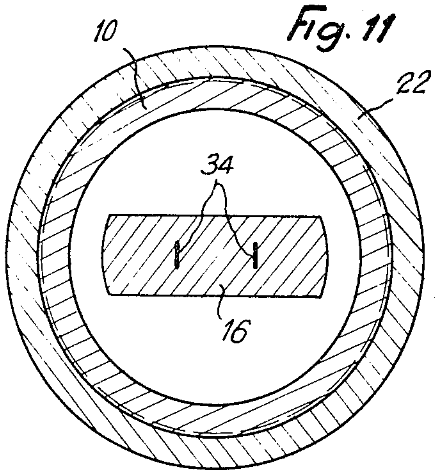

The section of part 16 which carries the ignition bead device 15 follows exactly the whole shape of the section left free by the retarding device as can be seen in FIG. 6.

However, a small longitudinal groove may possibly be left free to allow air to circulate when the casing 10 glides into the bush 22.

This arrangement constitutes an important characteristic of the invention, for the support 16 which is grooved to take up the ignition bead, is thus reinforced in this section. On the other hand, thanks to this arrangement the spraying of the ignited powder in all directions and which could be prejudicial to the precision of the delay setting, can be avoided.

For this reason, a device has been produced which allows the ignited powder to be directed on the right of the ignition bead to a precise point of the powder column relay 14. FIG. 2 and the section C—C shown in FIG. 5 clearly show that the primary charge 13 is itself protected when the detonator is set to give a short delay.

Further, the grooving of the support 16 for the locating of the bead 15 could support on the adjacent side to the charges a small metallic plate, made for example of copper or of aluminum.

As far as the dimensions of the support 16 in relation to those of the casing are concerned, it is obvious that the end of the support will not collide with the secondary charge 12 in zero delay position, a certain clearance having been provided between 16 and 12. To achieve this effect, the stop 20 of the casing is adapted to abut the head 27 in FIG. 2 of the support 16 of the ignition device.

The stop 20 shown in FIG. 12 and which serves as a stop for the zero setting may be made of a plastic material and may be fixed to the casing by gluing.

The stop 18 serves to limit the course of casing 10 and to define the igniting position which corresponds to the longest delay. The stop 18 is, therefore, adapted to contact section 19 of support 16. Thus, the stop 18 serves two purposes: on the one hand, it defines the delay position which is the longest and, on the other hand, by means of its upper section 23, it blocks the relay column 14 and its mounting 25.

This stop may be made of a plastic material and may be glued to the casing 10.

In order to avoid the penetration or humidity through the clearance existing between the head 27 and the bush 22, a seal joint 21 has been provided between the stops 18 and 20 in FIG. 2.

Details of this joint are shown in FIG. 16. One of the characteristics of this joint is that it can move on the support 16 between the stops 18 and 20 in FIG. 2. This arrangement allows the balancing of pressures between the internal part of the detonator and the atmospheric pressure. In fact, if the joint was fixed onto support 16, this would result in a tendency of either to increase or to reduce the interior pressure of the detonator in the course of the relative movements of casing 10 and bush 22.

The mobile joint, therefore, consists of the felts 28, shown in FIGS. 16 and 17, placed between the seal seats 29 which further support two tubes 30 which interlock the cheeks of the seal mounting 29. These tubes are perforated in such a manner that they allow a waterproof liquid 31, for example silicone, to permanently soak the felts 28. This liquid is particularly visible in FIG. 18 where it is shown in the section following the line of section Q—Q of FIG. 16.

Thus, the seal mounting 29, which may be made of plastic material, for example, may oscillate between two blocking stops 20 and 18, FIG. 2. In the position of the ignition bead which corresponds to a zero delay, the seal piston is located between the stop 20 of the casing 10 whereas in the delay position which is much higher, it is found to be up against the stop 18.

The relative movement of the ignition bead 15 in relation to the relay column 14 is obtained by rotating the casing 10 in relation to the bush 22 which brings about, by reason of the threading on these parts, either their approach or their distancing. The result is that the ignition bead 15 moves along the surface 26 of column 14 and thus takes up a position which corresponds to the required delay.

It must be noted that in the course of the rotation of casing 10, the longitudinal pins 24 of FIGS. 4 to 7 take with them the support 16, whose groove 30 on its head slides on the pin 30*a* of the bush 22, as can be seen in FIG. 15 and in FIG. 2.

The shape of support 16, whose section is a constant one in FIGS. 8 to 13, becomes cylindrical at 27 shown by sections K—K of FIG. 14 and L—L of FIG. 15. Here can be seen the fuse wires 17 with their insulation 32 and the central conducting section 33.

Figure 13:
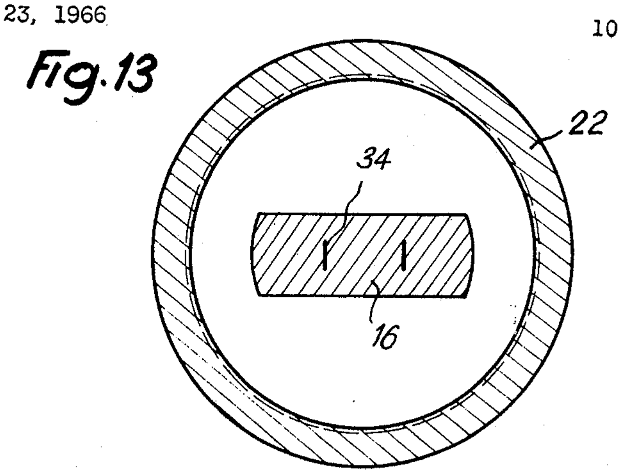

These wires are connected to the conducting blades 34, FIG. 13, which are themselves connected to the ignition resistance of bead 15.

According to another variant, section 27 of the support head 16 may be replaced by a threaded head without a groove as shown at 35 in FIG. 19. The threading is right-handed if the bush 22, in its section which contacts the threaded casing 10 is equipped inside with a left-handed thread. Thus, in this version, the section of bush 22 in contact with the support head 35 is threaded to the right whereas the opposite section in contact with the casing 10 has a left-handed thread. These opposing threadings obviously possess the same pitch.

Under these conditions, the movements of the casing 10 and of the head 35 in relation to the bush 22 take place in opposite directions, thus allowing the ignition bead 15 to move along relay 14.

In the same FIG. 19, a possible variant of the arrangement of the primary charge 36 has been shown and which may react on the secondary charge 12 along its whole profile.

In order to facilitate the setting adjustment, longitudinal lines 37 have been applied to the casing 10 and which are separated by a constant and graduated interval from 0 to 9 as shown in FIGS. 20 and 20*a*. Preferentially, the thread of the casing is such that if it is passed before a reference 38 of, for example, a line 37 to the following, the delay of the detonator will be modified by one millisecond.

Equally, cross lines 39, graduated by 10 (or 5) have been provided in such a manner that when the casing 10 makes one complete turn, i.e., the delay varies by 10 ms. or passes from a line 39 to the following. In the shown example, the delay amounts to 55 milliseconds.

A section of the metallic casing may be replaced by a transparent material so as to enable the section of the support 16 bearing the bead 15 to be visible. As previously, graduation lines 37 and 39 are engraved on the casing. A mark applied directly to the support 16 allows to read the number of tens of milliseconds applied by the cross graduations 39, whereas a mark on the bush determines the number of milliseconds with the help of the graduations 37. Thus, one obtains the value of the delay applied by adding these two readings together.

The detonator shown in FIG. 21 consists, as in the case of the detonator in FIG. 2, of a casing 41 comprising a secondary charge 42 and a primary charge 43 extending the delaying powder column 44. An ignition bead 45 fixed in the support 46 is controlled by an electric current supplied by means of the wires 47 and the conducting blades 48. The bead mounting 46, fixed to the bush 49 by means of the pins 50 may move in relation to column 44. Its course of movement to the left is limited by the stop 51 which comes into contact with the edge 52 of the support 46. If that is so then the detonator is set to the maximum delay. The stop 53 may serve for the setting of the minimum delay. The relay column 44 is fixed on the casing 41, its end 54 being fixed to the stop 55. In fact, the relay column 44 may be fixed to the casing 41 by any means whatsoever and especially by small pieces of thin sheeting, following exactly the shape of the casing 41 as far as its section opposite to column 44 is concerned and having two ends folded back into the upper part on which is supported the shell containing the powder column. Just as well one could provide two longitudinal pins obtained by simple lateral stamping of casing 41 along the section concerned, these pins serving for the guidance of the bead mounting 46 as well. A sealing device 56 slides on the shaft of the bead mounting 46 in such a manner as to avoid any penetration of humidity into the casing 41 which contains the charges.

However, in addition to these varied units, the detonator comprises a special device allowing the blocking of casing 41 in relation to the bush 49 after the value of the delay has been set, i.e., after the casing 41 has slid into the interior of the bush 49 bringing the ignition bead 45 to a determined point of column 44.

In order to facilitate the description of the blocking device, reference should be made to FIG. 22 which shows a detail of the detonator before same has been set. A part 57 of circular shape and with a rectangular profile is mounted on the bead mounting 46. Another part consisted by a roller ring comprising 4 small blades 58 transposed by 90° against each other, is mounted on the bead mounting as well. This part as well as part 57 is suitable to be moved without sliding until it meets up with a sufficiently great resistance to block their movement. Two rings 59 and 60 formed by any thin material, for example cellophane, each contains a determinate product, same being such that their mixture gives rise to an instantaneously solidifying product, or at least one which does so within a very short space of time.

Before any setting is carried out, the parts are located in the positions shown in FIG. 22. To obtain the desired setting, the operator draws the casing 41 step-by-step out of the bush 49. The bead mounting 46 moves from right to left, taking parts 57 and 58 with it. The resistance offered by the coverings 59 and 60 being weak, the blades 58 perforate them in such a manner that the products therein contained come into contact, solidify and are retained by part 57. When the operator continues to exercise his pull on the casing in order to bring the ignition bead to the required position, the blades 58 will continue being taken along by the bead mounting until they meet up with the stop 53. On the other hand, the retaining part 57 remains in the position indicated in FIG. 21, the mixed products tending to solidify hindering its movement. When the setting has been carried out, the solidification of the product hinders all movement between the bead mounting 46 and the casing 41. In one operation one obtains a means ensuring a perfect seal and an efficient means of avoiding any disorder. It is obvious that the products enclosed in the diaphragms 59 and 60, being already obtainable in the trade, may be of a very varied nature: quickly-setting resins, for example.

It must be noted that in the case of FIG. 21, the bead 45 is preferentially located in relation to the charge 43 in such a manner that when the operator wishes to obtain a delay of zero, he may proceed as for a delay of any value whatsoever and operate the just described blocking device.

FIG. 23 shows a detonator of the type which has just been described, but in which the value of the delay may be considerably increased with the help of an appropriate shape of the relay powder column which, in this model is helical. At the same time. the length of the detonator which in certain cases would impede its use, can also be reduced. Further, the precision of setting can also be increased by the use of a more or less slow retarding powder.

Inside the case 61 there is a bush 62 on whose surface four helicoidal grooves with the same pitch are engraved and transposed at 90° to each other. One is reserved for the composition of the retarding powder 64, the three others for the guidance of the bead mounting 63. The compound forming the primary charge is placed at the end of the compound of the retarding powder, as in the case of the just described detonator. It is, thus, preferentially placed at the end of the helicoidal groove containing the retarding powder 64.

Part 62 and the other grooves are shown in FIG. 24 which contains the section A—A of FIG. 23. In this section, the retarding compound appears at 64.

FIG. 25 shows the section B—B at the place where the ignition bead **45*a* has been brought to a certain point facing the retarding powder 64. The bead mounting 63 comprises a pin 63*a* sliding in the helicoidal groove opposite to the groove containing the retarding powder 64**.

Above the pin **63*a*, the resistance 65 supplied by the conductors 66 and 67, enables the ignition of powder 68** in which it is immersed.

In order to ensure a better guidance for the bead mounting, three pins, **63*b*, 63*c* and 63*d*, shown in FIG. 26, representing the section C—C, have been provided. In the given example, these pins are transposed by half a helical pitch behind the bead 68**.

The detonator obviously comprises the same units as those already described. The maximum delay stop 69, the sealing ring 70, the blades 71 of the blocking device appearing, for example, in FIG. 23. For greater clarity, the two helicoidal grooves in which the pins **63*b* and 63*d* circulate, have not been shown in this drawing. The contact between the end of the bead mounting 63 and the secondary charge 72** is avoided by providing an appropriate length for the bead mounting.

It is, therefore, possible with the help of the helicoidal movement of the bead mounting to obtain a continuous setting of the delay value with great precision, the blocking device previously described enabling maintenance of the ignition bead 68 in a well defined position and facing any point of the regarding column.

In order to determine with precision any delays whose values are multiples of a given delay, the invention provides a part in the form of a rack cooperating with the bead mounting. Such a part is shown at 73, FIG. 27. It is fixed to the casing 74 at the section left free by a longitudinal groove of the hollow cylinder formed by the retarding powder 75.

In order to show the numerous possibilities of realization offered by the present invention, a detonator has been chosen as an application sample in which the relay column 44 of FIG. 21 is replaced by a part of a hollow cylinder. The left-hand section of the detonator comprising the already described blocking device is not shown. However, it can be seen that the joint 56 of FIG. 21 could be substituted for part 57 of FIG. 22 and could possibly be made much thinner in order to give it more resistance.

If one refers to FIG. 28, it will be seen that the position of the bead mounting 76 is determined with precision by a spring 77 the end of which follows closely the shape of the teeth of the rack 73. Thus, the bead mounting 76 is always maintained in well determined positions corresponding to a precise value of a multiple of a given delay, when the spring 77 is applied against the back of a tooth of rack 73. If it is thus desired to set such a detonator, it suffices, as has been previously explained, to draw the bush of the casing 74 out up to the *n*th tooth of rack 73 and which corresponds to a value of delay equal to *n*-times the original own delay of the detonator. It is clear that the value of this delay may be any at all and that it only depends on the characteristics of the retarding powder as well as on the length of the teeth of the rack.

During the setting operation, the blocking device is brought into play in such a manner that the spring 77 cannot move onto the next tooth. Marks may be placed on the casing 74 but the setting could also be obtained with the air of a gauge determining the total length of the detonator for any given length.

In order to obtain precise ignition, the powder column 44 of the detonator in FIG. 21 has been replaced by a casing, the section of which is shown at 75, FIG. 30.

If one refers to FIG. 28 showing the section A—A indicated in FIG. 27, it will be seen that the primary charge 78 is shown in the shape of a broken casing in its lower part to let the rack 73 pass and above which rests the end of spring 77 fixed to the bead mounting 76.

FIG. 29 shows the ignition bead 79 shaped this time as a ring of powder broken at the right of the rack 77. The blades 80 conduct the current to the resistance 81 immersed in the ignition powder. Its shape of a circular arc allows the instantaneous ignition of the powder over all the section. At the same time, the instantaneous ignition of the casing 75 over the whole section faced by the bead 79 is obtained.

FIG. 30 shows the section of the bead mounting 76 facing the retarding powder 75. In this section, the base of spring 77 is embedded in the bead mounting 76.

If one refers to the new FIG. 27, it will be seen that the ignition ring 79 is facing the primary charge 78. This arrangement thus allows the blocking device to be operated even for the setting of the detonator delay to zero value which is done as indicated by moving the bead mounting to the left.

In the case of it being desired to improve the precision of the ignition by using a simple column of retarding powder only, analogous to that contained by the detonator of FIG. 21, FIG. 31 shows the provision of an aluminum plate 82, which may also consist of copper or of brass, however, and which possesses a series of openings 83. Each opening corresponds to a well determined delay which is a multiple of a given value. When the bead mounting 84 is brought to face one of the openings 83, the ignition bead ignites the retarding powder column 85 at a defined point and with precision. The location of the bead mounting can further be facilitated by incorporating a spring which cooperates with a rack, as has just been described, the spacing of the openings 82 corresponding to the spacing of two consecutive teeth of the rack.

According to the composition of the primary charge 86, an opening facing this charge can be provided to allow thus its direct ignition by the ignition bead of support 84.

If a still higher precision is desired, the retarding column of FIG. 31 can be replaced by that of FIG. 32. In this version, the retarding column is divided into a series of blocks 86 interspaced by blocks 87 of a thickness equal to the width of the openings 88 distributed in the metallic plate 89. These blocks may be of the same composition as the ignition powder or of a similar composition in such a manner that the ignition transmitted by fusion is instantaneously transmitted to the whole of the lateral surface of the adjacent block 86. An opening may be provided facing the primary charge 90 with a view to its direct reaction to the ignition bead.

The precision of the delay can be further increased by bringing about the ignition all around a column of retarding powder 91, FIG. 33, by using a bead mounting 92 completely surrounding column 91. In this version, the same blocking and sealing devices as previously described may be used.

The primary charge 93 extending the retarding powder column 91 may be surrounded by a ring 94 of the same composition or an analogous composition in such a manner as to bring about the ignition of the secondary charge 95 over the whole of the surface of its terminal section.

FIG. 34 shows the section A—A as indicated in FIG. 33 when the bead mounting 92 is placed in its initial position before setting of the delay. The resistance 96 is immersed in the ring 97 formed by the ignition powder. It is supplied with current from the conducting blades 98. The ignition bead thus completely surrounds the powder column 91 which is replaced in the section under consideration by the charge 93. The powder column 91 and the charge 93 are maintained with the aid of the shell 99. The bead mounting 92 presents a groove for the passage of the rack 100 identical with the racks already described.

The structure of the bead mounting may be of any type above this section and may only comprise, for example, two shafts as shown at 101 in FIG. 35. Each of these comprises a conducting blade 98, the end of which touches the ignition bead. The section shown has been made in the region where the casing 102 and the bush 103 do not have any other organ, i.e., between the stop serving for the maximum setting and the sealing filter.

The other parts of the detonator are identical to those already described and accordingly are not shown. It is clear that the filter seal and the diaphragms containing the products intended to block the detonator in its setting position, further possess two openings for the passage of the shafts 101.

FIG. 36 shows a variant of a detonator with a high precision delay and axial ignition in which the ignition bead mounting 104 locates the ignition bead 105 at its end and on its axis. A part 106, fixed to the bead mounting 104 maintains the retarding powder column 107 at its end. Before setting, by simply sliding the casing 108 in relation to the bush 109, the powder column 107 is located in a position which is practically completely surrounded by a ring of powder 110 of a similar composition to that of the ignition powder, by a powder ring of the primary charge 111 and by the cylinder 112 formed by the secondary charge. Thus, when ignition is brought about, the bead 65 ignites the end of the retarding powder column 107, which transmits the ignition to the powder ring 110 and brings about the instantaneous ignition of the primary charge 111 over the whole of its section in contact with 110. The primary charge in its turn, brings about the detonation of the secondary charge 112. A protective plate for the charges 110, 111 and 112 has been provided at 113.

The section A—A shown in FIG. 37 shows the casing 108 on the inside of which glides the part 106 fixed to the bead mounting 104. This part carries the retarding powder column 107 and presents an indentation to allow passage to the rack 114 and the spring 115 serving for the setting of the delay.

FIG. 38 shows a particular form of a detonator in which the ignition of the primary charge 135 is effected by locating on the axis *yy* of the bead mounting 117 a certain number of units 118 in the shape of small cylinders containing the retarding compound. These blocks 118 are normally arranged on the axis *xx*.

To simplify explanations it has been assumed that the detonator has been set to a delay of 3. Thus, in the example described, the delay O corresponds to a block 135 located in the part 137. The setting is effected as already indicated by drawing the casing 119 out of the bush 120.

The bead mounting 117 is of the same type as that shown at 104, FIG. 36, but instead of being secured to a part 106 supporting the retarding powder column 107, the bead mounting 117 is secured to a yoke 121 at the end of which there is a spring 122. The blocks 118 are maintained in the axis *xx* by a pair of blades 123 which can be better seen in FIGS. 39 and 40.

FIG. 39 represents the section A—A of that part of the detonator where the spring 122 is in contact with a block 118 resting on the longitudinal supports 124. The block 118 is laterally held by another pair of blades 125 which penetrate into the recesses 126 of the shell 127 of block 118 containing the retarding powder 128. The part 129 of the yoke 121 is located in such a manner that it separates the pair of blades 123 which allows the spring 122 to pass the block 118 from the axis *xx* to the axis *yy*, FIG. 21, when the operator sets the detonator to the position corresponding to the required delay. The setting rack is shown at 130.

The section B—B, FIG. 40, show the part of the yoke 121 located about the bead mounting 117 in which there is fixed the spring 131 which cooperates with the rack 130. In this region, the yoke 121 holds the pair of blades 123 in recesses 126 of the block 118. Similarly, the pair of blades 125 are held in the interior of the yoke 121 thus ensuring the holding of the blocks 118 located on the axis *yy* in the extension of the bead mounting 117, in which one can see the conducting blades 132. In its turn, the plate 134 together with the pair of blades 123 ensures that the blocks 118 are held without moving.

Thus, by simply sliding the casing 119 and bringing the spring 131 of the bead mounting into the tooth of row *n* of the rack, spring 122 of the yoke puts *n* blocks 118 into position in the axis of the ignition bead 133. On ignition, the ignition bead will ignite the powder in the last moved block 118 which will finally bring about the detonation of the primary charge 135 and of the secondary charge 136.

Although the preceding has only described a few of the variants of the methods of producing the detonator which is the object of the invention, it is clear that numerous substitutions, additions or omissions could be applied to the various units described without thus exceeding the framework of the present invention. Thus, for instance, the nature of the charges may lead to the protection of this or that part of the detonator by means of small metal plates. Similarly, the sealing could be ensured as well by two toric joints and the racks could be replaced by simpler parts showing simple recesses regularly spaced or not. In particular, the racks could consist of the shaft itself of the bead mounting and the spring fixed to the casing. Finally, according to each case, the stops fixing the values of the maximum and minimum delays could be omitted as could also be the filter or the blocking device.

What is claimed is:

1. A detonator comprising a casing means and a bushing means adapted to telescopically receive said casing means for relative axial movement therebetween, charge means secured in said casing means adjacent one end thereof, relay powder means comprising an elongated column of powder secured in contiguous relation to said charge means for movement with one of said relatively movable means, an ignition bead secured to a bead mounting member within said casing adjacent said relay powder column, means securing said bead mounting member to said bushing means for sliding movement relative to said casing means whereby upon relative telescopic movement of said casing means and said bushing means the position of said ignition bead along the length of said relay powder column is varied.

2. A detonator according to claim 1 wherein said charge means is formed as a hollow cylindrical tube and said relay powder column is secured to said bead mounting member for axial movement within said hollow tube formed by said charge means to vary the length of the relay powder column from said ignition bead to the point of emergence of said column from said tube.

3. A detonator as set forth in claim 1 wherein said ignition bead has an ignition wire embedded therein and connected to a pair of electrical leads which are adapted to be connected to an electric supply to fire said detonators and further comprising sealing means slidably disposed within said casing means, said sealing means provided with passage means for said bead mounting member and felt means impregnated with a liquid to seal said casing means to keep said charge means free of dust and moisture.

4. A detonator as set forth in claim 1 further comprising blocking means disposed between said casing means and said bead mounting member and adapted to be activated upon movement of said bead mounting member away from said charge means to quickly and rigidly bond said bead mounting member and said casing means together in the desired position of adjustment.

5. A detonator as set forth in claim 1 further comprising an elongated member having a plurality of equally spaced notches therein secured to the inside of said casing means parallel to said relay powder column and spring detent means secured to said bead mounting member and adapted to cooperate with said notches to positively locate said bead adjacent a predetermined portion of said relay powder column.

6. A detonator according to claim 1 wherein an elongated plate means having a series of openings along the length thereof is interposed between said relay powder column and said ignition bead to more positively define the point at which said ignition bead will ignite said relay powder column thereby enabling a more accurate setting of predetermined time delay periods.

7. A detonator according to claim 1 wherein said bead mounting member is in the form of a hollow cylinder adapted to surround said relay powder column and said ignition bead extends about the entire internal circumference of said bead mounting member adjacent said relay powder column.

8. A detonator as set forth in claim 1 wherein said relay powder column is comprised of a plurality of small cylinders having a shell enclosing said retarding powder, first guide means parallel to said bead mounting member adapted to support a plurality of said small cylinders in axial alignment with each other, said charge means and said bead mounting member, second guide means parallel to said first guide means and offset therefrom and adapted to support and guide a plurality of said small cylinders in axial alignment with each other parallel to said bead mounting means, spring means secured to said bead mounting means in alignment with said second guide means and adapted to cam said small cylinders from said second guide means to said first guide means upon axial movement of said bead mounting member away from said charge means to vary the length of the relay powder column in alignment with said bead.

9. A detonator according to claim 1 wherein said bead mounting member is concentrically disposed within said casing means and is provided with a helical spline, a hollow cylindrical member disposed in and secured to said casing means about said bead mounting member, a pair of helical grooves formed in the internal surface of said cylindrical member, one of said grooves receiving said spline to enable the bead mounting member to be screwed into and out of said cylindrical member, and the other of said grooves being filled with retarding powder to define a helical retarding powder column adapted to be disposed along the path of said bead.

References Cited

UNITED STATES PATENTS

| | | | |
|---|---|---|---|
| 904,492 | 11/1908 | Maxim | 102—85.2 |
| 3,131,633 | 5/1964 | Eisler et al. | 102—21.6 |

FOREIGN PATENTS

| | | |
|---|---|---|
| 419,509 | 10/1925 | Germany. |

BENJAMIN A. BORCHELT, *Primary Examiner.*

V. P. PENDEGRASS, *Assistant Examiner.*